(12) United States Patent
Dannemann et al.

(10) Patent No.: US 10,808,724 B2
(45) Date of Patent: Oct. 20, 2020

(54) ROTOR OF AN ELECTRIC MOTOR

(71) Applicant: ebm-papst Landshut GmbH, Landshut (DE)

(72) Inventors: Jan Dannemann, Neustadt in Holstein (DE); Jan Weltzer, Landshut (DE); Martin Deininger, Geisenhausen (DE); Martin Hertreiter, Loiching (DE); Frank Schlopakowski, Landshut (DE)

(73) Assignee: ebm-papst Landshut GmbH, Landshut (DE)

( * ) Notice: Subject to any disclaimer, the term of this patent is extended or adjusted under 35 U.S.C. 154(b) by 73 days.

(21) Appl. No.: 15/902,120

(22) Filed: Feb. 22, 2018

(65) Prior Publication Data

US 2018/0238349 A1    Aug. 23, 2018

(30) Foreign Application Priority Data

Feb. 23, 2017  (DE) .................... 10 2017 103 774
Jun. 30, 2017  (DE) .................... 10 2017 114 683

(51) Int. Cl.
*H02K 15/12*     (2006.01)
*F04D 29/02*     (2006.01)
(Continued)

(52) U.S. Cl.
CPC ......... *F04D 29/5813* (2013.01); *F04D 25/06* (2013.01); *F04D 25/0606* (2013.01); *F04D 25/08* (2013.01); *F04D 29/023* (2013.01); *F04D 29/281* (2013.01); *F04D 29/403* (2013.01); *F04D 29/662* (2013.01); *F04D 29/668* (2013.01); *H02K 1/278* (2013.01);
(Continued)

(58) Field of Classification Search
CPC ............ H02K 1/22; H02K 1/27; H02K 1/272; H02K 1/2726; H02K 1/273; H02K 1/2733; H02K 1/28; H02K 7/00; H02K 7/04; H02K 7/14; H02K 9/00; H02K 9/06; F04D 25/06; F04D 25/0606; F04D 25/08; F04D 29/02; F04D 29/023; F04D 29/026; F04D 29/28; F04D 29/281; F04D 29/58; F04D 29/581; F04D 29/5813; F04D 29/66; F04D 29/662; F04D 29/668; F04D 13/0673

See application file for complete search history.

(56) References Cited

U.S. PATENT DOCUMENTS 5,476,366 A * 12/1995 Weihsmann .......... F04D 29/281
                                                         416/218
5,591,008 A *  1/1997 Wrobel ................. F04D 29/662
                                                         416/144
(Continued)

FOREIGN PATENT DOCUMENTS

DE        44 21 855 A1    1/1996
DE       102 58 346 A1    6/2004
(Continued)

*Primary Examiner* — Tran N Nguyen
(74) *Attorney, Agent, or Firm* — Scully Scott Murphy and Presser

(57) ABSTRACT

The invention relates to a rotor (30) of an electric motor having a shaft (33) and a magnet (32) disposed on said shaft (33), wherein the magnet (32) is attached to the shaft (33) using an injection molded plastic material and the plastic material forms a cooling vane (31) which generates a cooling air flow when the rotor (30) is in operation.

10 Claims, 1 Drawing Sheet

(51) Int. Cl.
    *F04D 29/58*     (2006.01)
    *H02K 9/06*     (2006.01)
    *H02K 1/27*     (2006.01)
    *F04D 25/06*     (2006.01)
    *F04D 25/08*     (2006.01)
    *F04D 29/28*     (2006.01)
    *F04D 29/40*     (2006.01)
    *F04D 29/66*     (2006.01)
    *H02K 1/28*     (2006.01)
    *H02K 7/04*     (2006.01)
    *H02K 7/14*     (2006.01)

(52) U.S. Cl.
    CPC ......... *H02K 1/2726* (2013.01); *H02K 1/2733* (2013.01); *H02K 1/28* (2013.01); *H02K 7/04* (2013.01); *H02K 7/14* (2013.01); *H02K 9/06* (2013.01); *H02K 15/12* (2013.01)

(56) References Cited

U.S. PATENT DOCUMENTS

| | | |
|---|---|---|
| 7,012,346 B2 | 3/2006 | Hoffman et al. |
| 2004/0062648 A1* | 4/2004 | Makinson ........... F04D 13/0606 416/3 |
| 2007/0014677 A1* | 1/2007 | Chen .................... F04D 13/0673 417/423.1 |
| 2007/0024131 A1 | 2/2007 | Rouleau et al. |
| 2007/0114858 A1 | 5/2007 | Lee et al. |
| 2011/0025159 A1 | 2/2011 | Wade |
| 2011/0226245 A1* | 9/2011 | Gillespie ........... A61M 16/0066 128/203.26 |
| 2012/0067347 A1* | 3/2012 | Bothma ........... A61M 16/0066 128/204.17 |
| 2013/0069469 A1* | 3/2013 | Kodani ................ H02K 1/2733 310/156.38 |
| 2013/0149128 A1 | 6/2013 | Yin et al. |
| 2016/0006303 A1 | 1/2016 | Hoemann et al. |

FOREIGN PATENT DOCUMENTS

| | | |
|---|---|---|
| DE | 102013215561 A1 | 3/2015 |
| DE | 10 2017 114 230 A1 | 12/2017 |
| EP | 2124316 A1 | 11/2009 |
| EP | 2573917 A2 | 3/2013 |
| JP | 02174528 A | 7/1990 |
| JP | 09065614 A | 3/1997 |
| JP | 2002010545 A | 1/2002 |
| JP | 2002136051 A | 5/2002 |
| JP | 2003037953 A | 2/2003 |
| JP | 2008160973 A | 7/2008 |
| WO | 2004/008603 A2 | 1/2004 |

* cited by examiner

ROTOR OF AN ELECTRIC MOTOR

The invention relates to a rotor of an electric motor, particularly for driving blowers, particularly premix blowers for gas and air.

It is known in the art for rotors of a generic type to attach the armature, i.e. the magnet, on the shaft by plastic overmolding.

It is the object of this invention to use rotor, a rotating component, simultaneously as an element which generates a cooling air flow and to configure said rotor in a compact design and having as few parts as possible. Furthermore, the invention is to utilize an injection molding process and ensure demoldability.

This object is achieved by a combination of features according to claim 1.

According to the invention, a rotor of an electric motor having a shaft and a magnet disposed on said shaft is proposed, wherein the magnet is attached to the shaft using an injection molded plastic material and the plastic material forms a cooling vane which generates a cooling air flow when the rotor is in operation.

It is advantageous in this context that the plastic material that is injection molded anyway between the magnet and the shaft for fastening is in addition used for forming the cooling vane. This eliminates the assembly steps of attaching a cooling vane to the rotor. It also reduces the number of parts and the manufacturing costs.

The cooling vane on the rotor is suitable for cooling the motor electronics which is often installed adjacent to the rotor, such that a defined cooling air flow can be conducted to the motor electronics when the rotor is in operation. At any rate, a flow is generated which counteracts heat accumulation.

In an advantageous embodiment of the rotor, the cooling vane comprises a plurality of cooling blades which form a blade ring in the circumferential direction. The cooling vane is thus designed like a blower wheel and can generate a defined and directed cooling air flow.

Furthermore, a design is favorable in which the axial front sides of the cooling blades are completely free and uncovered. It is particularly advantageous in this context that the cooling vane can be demolded in an axial direction, making it possible that a simple injection molding tool can be used, as is common in prior art.

In one embodiment of the rotor, the cooling blades are curved in an axial top view, particularly curved forward or backward, to increase the cooling output.

In a further development of the rotor, the cooling vane comprises an integral balancing rim which is indirectly or directly adjacent to the magnet. The balancing rim can advantageously be used to compensate an imbalance of the rotor and to achieve low-vibration operation at higher speeds. In various embodiments, the balancing rim has milled-out portion or recess or a balancing weight. The missing mass of a milled-out portion or recess or the locally added mass by a balancing weight are used as balance compensation.

In an advantageous embodiment of the rotor, the cooling vane and the magnet are immediately adjacent in the axial direction. This particularly allows that the balancing rim can be disposed immediately adjacent to the magnet, which in most cases makes the major contribution to an imbalance.

In another embodiment of the rotor, the cooling vane defines an axial free end of the rotor. This also supports easy demoldability and generation of a cooling air flow at the axial portion of the rim.

In the rotor, the magnet is fastened to the shaft using the plastic material that forms the cooling vane. In the rotor, the cooling vane, the magnet, and the shaft form an integral unit connected by the plastic material.

It has proven advantageous for connecting the components that the plastic material encloses at least portions of the magnet from both axial sides and in this way also fixes it to the shaft. A duct is formed between the magnet and the shaft, which establishes a connection between two opposite axial sides of the magnet and thus ensures two-sided axial attachment of the magnet. The duct is filled with the plastic material that forms the cooling vane.

In a further development of the rotor the magnet comprises a recess, which is on a side opposite the cooling vane, and filled with the plastic material that forms the cooling vane. The axial recess provides the option of an axially planar surface of the magnet and thus improved connection options to other components.

The invention further includes an electric motor having the rotor described above.

Other advantageous further developments of the invention are explained in more detail below with reference to the figures as part of the description of a preferred embodiment of the invention. Wherein.

Like reference symbols identify like components in all views. All disclosed features can be combined in any desired manner, where technically feasible and not contradictory.

Figure 1:
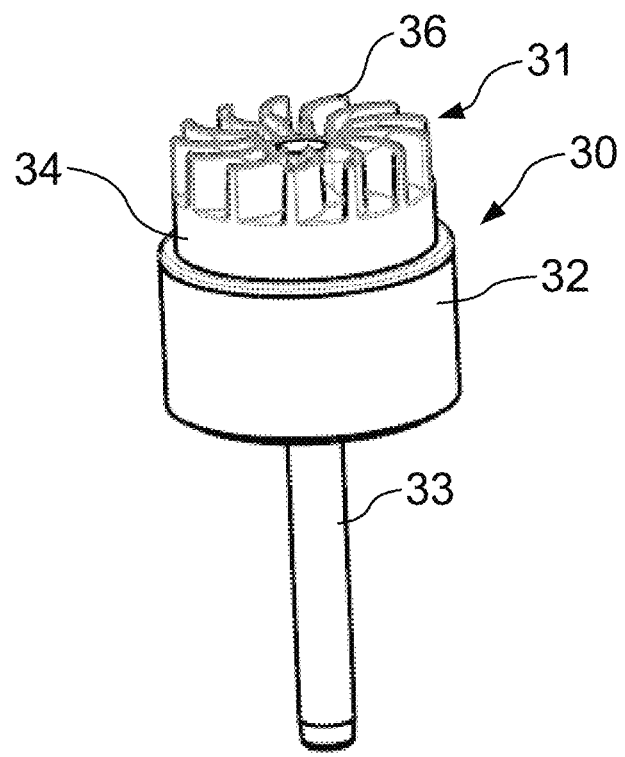
FIG. 1 shows an exemplary embodiment of a rotor according to the invention.
Figure 2:
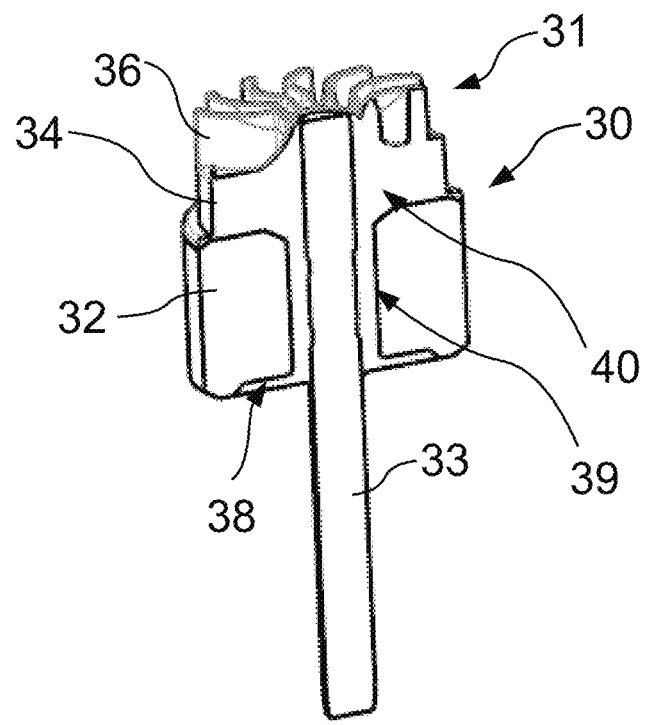
FIG. 2 shows a sectional view of the rotor from FIG. 1.

FIG. 1 shows a perspective view, FIG. 2 shows a sectional view of a rotor 30 of an electric motor having a shaft 33, a magnet 32 disposed on the shaft 33, which magnet is fastened by a plastic material 40 which is injection molded onto the shaft 33. The plastic material 40 at the same time integrally forms a cooling vane 31 having a plurality of cooling blades 36 which are and disposed in the circumferential direction at a spacing as a blade ring. The respective axial front sides of the cooling blades 36 is completely free and uncovered. The cooling vane 31 and the rotor 30 can be demolded in an axial direction.

The cooling vane 31 corresponds to a blower wheel disposed at the magnet 32. When the rotor 30 is in operation, the cooling blades 36 generate a cooling air flow to cool a motor electronics which can be disposed adjacently.

The cooling vane 31 comprises a balancing rim 34 which is immediately adjacent to the magnet 32 and which can be used to compensate an imbalance of the rotor 30, for example by a milled-out portion. The size of the balancing rim is variable, but the axial length of the cooling blades 36 is greater than the axial length of the balancing rim 34 in the embodiment shown. The maximum outer diameter of the cooling vane 31 is somewhat smaller than that of the magnet 32.

The entire rotor is designed as an integral, single-piece unit. The duct 39 is formed between the magnet 32 and the shaft 33 and establishes the connection between the two opposite axial sides of the magnet 32. On the side opposite the cooling vane 31, the magnet 32 comprises the recess 38 into which the plastic material 40 can penetrate and which forms a planar axial surface with the magnet 32. At the same time, the plastic material 40 in the recess 38 fixes the magnet 32 in the axial direction to the shaft 33. On the axial side opposite the recess 38, the magnet 32 is fixed via the cooling vane 31, particularly its balancing rim 34. The plastic material 40 encloses the magnet 32 from both axial sides. The duct 39 is also filled with the plastic material 40 that forms the cooling vane 31. Fixation is achieved using an injection molding process. Materials known from prior art can be used as plastic material.

The invention claimed is:

1. A rotor of an electric motor having a shaft and a magnet disposed on said shaft,
    wherein the magnet is attached to the shaft using an injection molded plastic material and the plastic material forms a cooling vane, the cooling vane generating a cooling air flow when the rotor is in operation,
    wherein the cooling vane comprises a plurality of cooling blades, the plurality of cooling blades forming a blade ring;
    wherein the cooling blades are curved in an axial top view;
    wherein the cooling vane comprises a balancing rim indirectly or directly adjacent to the magnet,
    wherein a duct is formed between the magnet and the shaft,
    the duct establishes a connection between two opposite axial sides of the magnet and is filled with the plastic material that forms the cooling vane;
    wherein the magnet comprises a recess, which is on a side opposite the cooling vane, and filled with the plastic material that forms the cooling vane and the magnet is partially uncovered by the plastic material; and
    wherein the maximum outer circumferential diameter of the cooling vane is smaller than the maximum outer circumferential diameter of the magnet, such that the magnet is partially uncovered by the cooling vane circumferentially and radially.

2. The rotor according to claim 1, wherein axial front sides of the cooling blades are completely free and uncovered.

3. The rotor according to claim 1, wherein the cooling vane can be demolded in an axial direction.

4. The rotor according to claim 1, wherein the balancing rim comprises at least one milled-out portion or recess or a balancing weight.

5. The rotor according to claim 1, wherein the cooling vane and the magnet are immediately adjacent in the axial direction.

6. The rotor according to claim 1, wherein the cooling vane defines an axial free end of the rotor.

7. The rotor according to claim 1, wherein the magnet is attached to the shaft by injection molding using the plastic material which forms the cooling vane.

8. The rotor according to claim 1, wherein the cooling vane, the magnet, and the shaft form a single-piece unit connected by the plastic material.

9. The rotor according to claim 1, wherein the plastic material encloses at least portions of the magnet from both axial sides, such that the plastic material fixes the magnet to the shaft.

10. An electric motor having a rotor according to claim 1.

* * * * *